Patented Dec. 9, 1941

UNITED STATES PATENT OFFICE 2,265,217

D - LYSERGIC ACID - 1,3 - DIHYDROXYTRI-METHYLENEAMIDE-2 AND A PROCESS FOR ITS PREPARATION

Arthur Stoll and Albert Hofmann, Basel, Switzerland, assignors to Sandoz A. G., Basel, Switzerland No Drawing. Application May 24, 1940, Serial No. 337,110. In Switzerland June 6, 1939

3 Claims. (Cl. 260—236)

The present invention relates to the manufacture of a new amide of lysergic acid which possesses valuable pharmacological properties.

In our U. S. Patent No. 2,090,430 we have described a process for the preparation of lysergic acid amides which consists in condensing lysergic acid azide with a primary or secondary amine.

We have now found that by condensing iso-lysergic acid azide with 1,3-dihydroxy-2-aminopropane and subjecting the product thus obtained to a transposition treatment, d-lysergic acid-1,3-dihydroxytrimethyleneamide-2 will be obtained, which possesses physiological properties similar to those of the most utero-active alkaloids from ergot (Ergobasine, Ergonovine) known until now, but which, as compared to this product, has a much better solubility in water, yielding easily a 10% aqueous solution and which possesses a lower cumulative property, being more easily eluated from the body.

The following example shows how the synthesis of the new alkaloidal body can be carried out, the parts being by weight:

Example 2 parts of d-isolysergic acid hydrazide are transformed in the usual way into the respective azide by treating it in presence of hydrochloric acid with sodium nitrite at 0° C. The acid solution thus obtained is then neutralized with sodium bicarbonate and the azide extracted from the solution by means of 300 parts of ether. The ethereal solution is then dried with freshly calcined potassium carbonate at 0° C. during 15 minutes. To this freshly prepared solution of the azide is added a solution of 2 parts of 1,3-dihydroxy-2-aminopropane in 10 parts of ethanol. The solution begins to become turbid, but after some time a precipitation of crystals can be observed. After standing over night at room temperature the yellow crystals are filtered and 1.8 parts of d-isolysergic acid-1,3-dihydroxytrimethyleneamide-2 are obtained. On concentration of the ethereal mother liquor other 0.15 part will be obtained. After crystallisation from hot ethanol, the new compound is obtained in beautifully cut prisms. It melts under decomposition at 231° C. (corr.). The optical rotation is $$[\alpha]^{20}_D = +445°$$

(c=0.7 in pyridine). This new compound is difficultly soluble in water, ethanol and nearly all organic solvents, but rather easily soluble in pyridine. The analysis has given the following values:

Calculated for $C_{19}H_{23}O_3N_3$

C 66.80 H 6.86 N 12.32%
C 66.82 H 6.79 N 12.32%

The transposition of the isolysergic acid derivative into its respective compound of the lysergic acid series can be carried out by treating the above cited compound with acids, such as acetic acid, phosphoric acid, or alkalies, such as sodium and potassium hydroxide. This transposition can be carried out for instance in the following way:

2 parts of d-isolysergic acid-1,3-dihydroxytrimethyleneamide-2 are dissolved in 300 parts of hot ethanol; 2 parts of an aqueous phosphoric acid of 86% are added thereto and the mixture is boiled in a stream of nitrogen during 45 minutes under a reflux condenser. The alcohol is then evaporated in vacuo, until the volume of the solution is 100 parts, and the precipitated phosphate is caused to dissolve by adding 100 parts of water thereto. To this solution are added 30 parts of potassium carbonate and the alkaloids extracted first with 2000 parts and thereupon twice with each time 1000 parts of ether. After drying the ethereal solution with sodium sulphate, the ether is evaporated and 1.9 parts of a mixture consisting of d-lysergic acid-1,3-dihydroxytrimethyleneamide-2 and d-isolysergic acid derivative is obtained. By treating this mixture with 10 parts of absolute ethanol, the untransformed iso-compound crystallizes out. The alcoholic mother liquor is then evaporated and extracted twice with 10 parts of cold water, whereby the easily soluble lysergic acid derivative can be separated from the isolysergic compound. Yield 0.5 part. The lysergic acid compound thus obtained can be easily purified by transforming it into a salt of an organic or inorganic acid, for instance into the acid oxalic acid salt, for instance as follows:

0.75 part of a raw base is dissolved in 10 parts of hot ethanol of 95% and a hot solution of 0.28 part of crystallized oxalic acid in 10 parts of ethanol of 95% is added thereto. The acid oxalate of the d-lysergic acid-1,3-dihydroxytrimethyleneamide-2 crystallizes immediately out in form of fine needles. Its optical rotation is $$[\alpha]^{20}_D = +55°$$

(c=0.6 in water). The analysis has given the following values:

Calculated for $C_{21}H_{25}O_7N_3$

C 58.21 H 6.42 N 9.67%
C 58.44 H 5.84 N 9.75%

The free base and the salts of the base give the Keller's and van Urk's reaction.

The free base prepared from the oxalate by saturating its aqueous solution with potassium carbonate and extracting with a large quantity of ether is very easily soluble in water, giving at least 10% aqueous solutions. The base is also easily soluble in alcohols and acetone, but difficultly soluble in benzene. By careful dilution with chloroform of a concentrated methanol solution, the base precipitates in form of leaflets, which still contain chloroform as crystal solvent and which melt under decomposition at 125° C. (corr.).

What we claim is:

1. The d-lysergic acid-1,3-dihydroxytrimethyleneamide-2 of the formula $C_{19}H_{23}O_3N_3$, which is easily soluble in water, alcohols and acetone, but difficultly soluble in benzene, which gives easily water-soluble salts with inorganic and organic acids, the acid oxalate of the base having the optical rotation $$[\alpha]^{20°}{}_D = +55°$$

(c=0.6 in water), which gives the Keller's and van Urk's color reaction and which possesses utero-active properties.

2. The easily water-soluble salts of the d-lysergic acid-1,3-dihydroxytrimethyleneamide-2 of the formula $C_{19}H_{23}O_3N_3$ with inorganic and organic acids, which are easily soluble in water and which give the Keller's and van Urk's reaction.

3. The acid oxalate of d-lysergic acid-1,3-dihydroxytrimethyleneamide-2, which is very easily soluble in water, and which gives the Keller's and van Urk's color reaction.

ARTHUR STOLL.
ALBERT HOFMANN.